United States Patent
Yoshino

(10) Patent No.: US 8,205,667 B2
(45) Date of Patent: Jun. 26, 2012

(54) HEAT EXCHANGER WITH CONNECTOR

(75) Inventor: Makoto Yoshino, Okazaki (JP)

(73) Assignee: Denso Corporation, Kariya (JP)

( * ) Notice: Subject to any disclaimer, the term of this patent is extended or adjusted under 35 U.S.C. 154(b) by 1048 days.

(21) Appl. No.: 12/148,249

(22) Filed: Apr. 17, 2008

(65) Prior Publication Data

US 2008/0264621 A1  Oct. 30, 2008

(30) Foreign Application Priority Data

Apr. 27, 2007  (JP) .................................. 2007-119892

(51) Int. Cl.
*F28F 9/04* (2006.01)
*F28D 7/06* (2006.01)
(52) U.S. Cl. ........................................ 165/178; 165/176
(58) Field of Classification Search .................. 165/173, 165/175, 176, 178, 153, 132; 285/319, 188; 62/509
See application file for complete search history.

(56) References Cited

U.S. PATENT DOCUMENTS

| | | | | |
|---|---|---|---|---|
| 5,163,716 A | * | 11/1992 | Bolton et al. ............... | 285/142.1 |
| 5,363,910 A | * | 11/1994 | Baba et al. ...................... | 165/153 |
| 5,546,761 A | * | 8/1996 | Matsuo et al. .................. | 62/509 |
| 5,765,877 A | * | 6/1998 | Sakane et al. .................. | 285/93 |
| 5,974,828 A | * | 11/1999 | Guerand .......................... | 62/509 |
| 6,443,223 B2 | * | 9/2002 | Ichiyanagi .................... | 165/178 |
| 6,851,468 B2 | * | 2/2005 | Kaspar et al. ................. | 165/132 |
| 6,915,659 B2 | * | 7/2005 | Seno et al. ...................... | 62/509 |
| 7,178,837 B2 | | 2/2007 | Yoshino | |
| 2004/0182553 A1 | * | 9/2004 | Seno et al. ..................... | 165/132 |
| 2005/0110274 A1 | | 5/2005 | Yoshino | |
| 2006/0220380 A1 | | 10/2006 | Yoshino | |
| 2008/0048447 A1 | | 2/2008 | Yoshino | |

FOREIGN PATENT DOCUMENTS

| | | |
|---|---|---|
| JP | 5-022985 | 3/1993 |
| JP | Y2-7-000794 | 1/1995 |
| JP | 2003-314988 | 11/2003 |
| JP | 2004-183703 | 7/2004 |
| JP | 2004-219027 | 8/2004 |
| JP | 2005-155766 | 6/2005 |
| JP | 2005-330995 | 12/2005 |
| JP | 2006-313010 | 11/2006 |
| WO | WO 2005108896 A1 * | 11/2005 |

OTHER PUBLICATIONS

Office action dated Sep. 25, 2009 in corresponding Chinese Application No. 2008 10081813.2.
U.S. Appl. No. 12/005,253, filed Dec. 26, 2007, Yoshino et al.
Office action dated Dec. 16, 2008 in Japanese Application No. 2007-119892.

* cited by examiner

*Primary Examiner* — Tho V Duong
(74) *Attorney, Agent, or Firm* — Harness, Dickey & Pierce, PLC

(57) ABSTRACT

A heat exchanger includes a plurality of tubes, a header tank coupled to the plurality of tubes, and a connector coupled to the header tank. The connector includes a female joint part that is to be coupled to a male joint part of an external pipe and a tubular part that extends from the female joint part and has a closed end on a side opposite to the female joint part. The connector is coupled to the header tank such that a side wall of the tubular part is located on an outer periphery of the header tank.

13 Claims, 7 Drawing Sheets

HEAT EXCHANGER WITH CONNECTOR

CROSS REFERENCE TO RELATED APPLICATION

This application is based on Japanese Patent Application No. 2007-119892 filed on Apr. 27, 2007, the disclosure of which is incorporated herein by reference.

FIELD OF THE INVENTION

The present invention relates to a heat exchanger having a connector and a method of manufacturing the connector.

BACKGROUND OF THE INVENTION

A coupling structure for coupling a heat exchanger and an external pipe is, for example, described in U.S. Pat. No. 5,765,877. The disclosed coupling structure includes the external pipe having a male joint part, a connector having a female joint part with openings, and an engagement member having arced projections. The connector is arranged on a fixing part formed on a header tank of the heat exchanger such as a condenser. The arced projections of the engagement member have elasticity in a radial direction.

In a condition that the arced projections are fitted in the opening of the female joint part from an inner peripheral side, the male joint part of the pipe is inserted into the female joint part. At this time, the male joint part enters the female joint part while pressing the arced projections in a radially outward direction against the elasticity.

When the male joint part is brought into contact with a rear end of the female joint part after passing through the arced projections, the arced projections return to original positions by the elasticity. As a result, the male joint part is received between the female joint part and the engagement member, and hence the pipe is coupled to the connector. In other words, the pipe is coupled to the connector through the engagement member.

For example, a condenser for a vehicular air conditioner is mounted at a front portion in an engine compartment, and is connected to devices of a refrigerant cycle, such as a compressor and an expansion valve, through refrigerant pipes. To ease coupling of the condenser to the refrigerant pipes, connector are generally arranged to face front so that the coupling is performed in front of the condenser.

However, in the coupling structure disclosed in U.S. Pat. No. 5,765,877, the fixing part between the connector and the header tank, the female joint part and the male joint part are linearly disposed. Thus, an entire length of the coupling structure increases. That is, a projected length of the coupling structure in a frontward direction increases.

SUMMARY OF THE INVENTION

The present invention is made in view of the foregoing matter, and it is an object of the present invention to provide a heat exchanger capable of reducing a mounting space. It is another object of the present invention to provide a method of manufacturing a connector for a heat exchanger, the method being capable of reducing manufacturing costs and improving productivity.

According to an aspect of the present invention, a heat exchanger includes a plurality of tubes, a header tank coupled to the plurality of tubes, and a connector having a generally tubular shape and coupled to the header tank. The connector includes a female joint part to be coupled to a male joint part of an external pipe and a tubular part that extends from the female joint part and has a closed end on a side opposite to the female joint part. The connector is disposed such that a side wall of the tubular part is located on an outer periphery of the header tank.

For example, the connector is coupled such that a projected width of the connector in a longitudinal direction of the plurality of tubes from a side end of the header tank is smaller than a width of the connector in the longitudinal direction of the plurality of tubes. Accordingly, the dimension of the heat exchanger in the longitudinal direction of the plurality of tubes is reduced.

As another example, the connector is coupled such that the closed end of the tubular part is aligned with a rear end of the header tank. Thus, a projected length of the connector in a direction substantially perpendicular to the longitudinal direction of the plurality of tubes, such as, in a frontward direction of the heat exchanger, is smaller than a length of the connector. Accordingly, the dimension of the heat exchanger in the direction substantially perpendicular to the longitudinal direction of the plurality of tubes is reduced.

Accordingly, a space for mounting the heat exchanger with the connector is reduced.

According to an aspect of a method of manufacturing a connector for a heat exchanger, a tubular part and a female joint part, which has a shape corresponding to a male joint part of an external pipe, are formed from a pipe member by pressing, and an end of the tubular part is covered by closing.

Accordingly, the connector is manufactured with reduced costs and high productivity.

According to another aspect of a method of manufacturing a connector for a heat exchanger, a female joint part to be coupled to a male joint part of an external pipe and a tubular part extending from the female joint part and having a closed end are integrally formed by cold forging.

Accordingly, the connector is manufactured with reduced costs and high productivity.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereafter, exemplary embodiments of the present invention will be described with reference to the accompanying drawings. In the second and third embodiments, components similar to those of the first embodiment will be indicated by the same numerals and will not be described further.

First Embodiment

Figure 1:
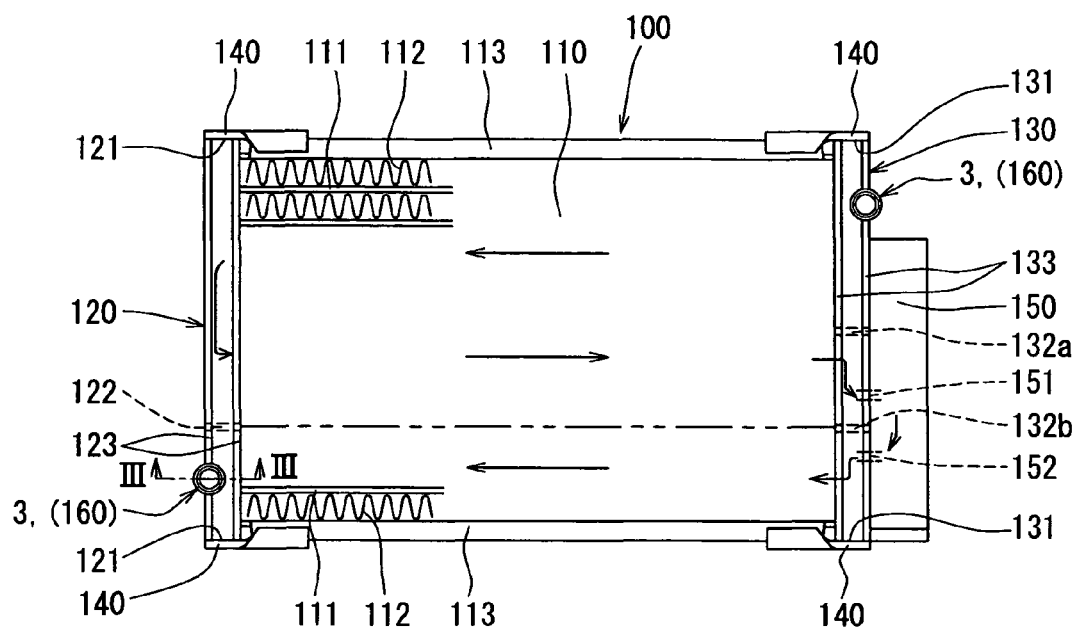
FIG. 1 is a schematic side view of a condenser according to a first embodiment of the present invention.

Referring to FIGS. 1 to 6, a heat exchanger of the first embodiment is exemplarily employed as a condenser 100 that condenses and liquefies a refrigerant of a refrigerant cycle of a vehicular air conditioner. Referring to FIG. 1, the condenser 100 generally includes a core 110, a first header tank (e.g., left header tank in FIG. 1), a second header tank (e.g., right header tank in FIG. 1), cap members 140, a modulator tank 150, and the like. The respective components are made of a metal, such as aluminum or aluminum alloy. The respective components are preliminarily fixed such as by fitting, crimping, holding and the like, and then brazed in the preliminarily fixed condition.

The core 110 includes tubes 111 that defines passages through which an internal fluid, such as the refrigerant, flows and fins 112. The fins 112 are, for example, corrugate fins. The tubes 111 and the fins 112 are alternately stacked. Further, side plates 113 as reinforcement members are arranged along outermost fins 112, which are stacked in the outermost layers (e.g., upper most layer and lowermost layer in FIG. 1). Each of the side plates 113, for example, has a substantially U-shaped cross-section.

The tubes 111 are arranged at predetermined intervals, and the fins 112 are arranged between the tubes 111. The tubes 111, the fins 112 and the side plates 113 are integrally brazed.

The first and second header tanks 120, 130 are arranged at the right and left ends of the core 110. In other words, the first and second header tanks 120, 130 are arranged at the longitudinal ends of the tubes 111. The first and second header tanks 120, 130 extend in a direction intersecting with a longitudinal direction of the tubes 111, such as in a direction substantially perpendicular to the longitudinal direction of the tubes 111. The first and second header tanks 120, 130 are formed with tube holes on inner surfaces thereof for receiving the longitudinal ends of the tubes 111, the inner surfaces facing the core 110.

The first and second header tanks 120, 130 are brazed with the core 110 in a condition that the longitudinal ends of the tubes 111 are fitted in the tube holes. Thus, the longitudinal ends of the tubes 111 are in communication with the first and second header tanks 120, 130. Further, the longitudinal ends of the side plates 113 are brazed with the first and second header tanks 120, 130.

The first and second header tanks 120, 130 have a substantially similar structure. Thus, a structure of the first header tank 120 will be hereinafter described in detail, as an example. The first header tank 120 is a tubular body having a substantially oval shape in a cross section defined in a direction perpendicular to a longitudinal axis of the tubular body.

Figure 2:
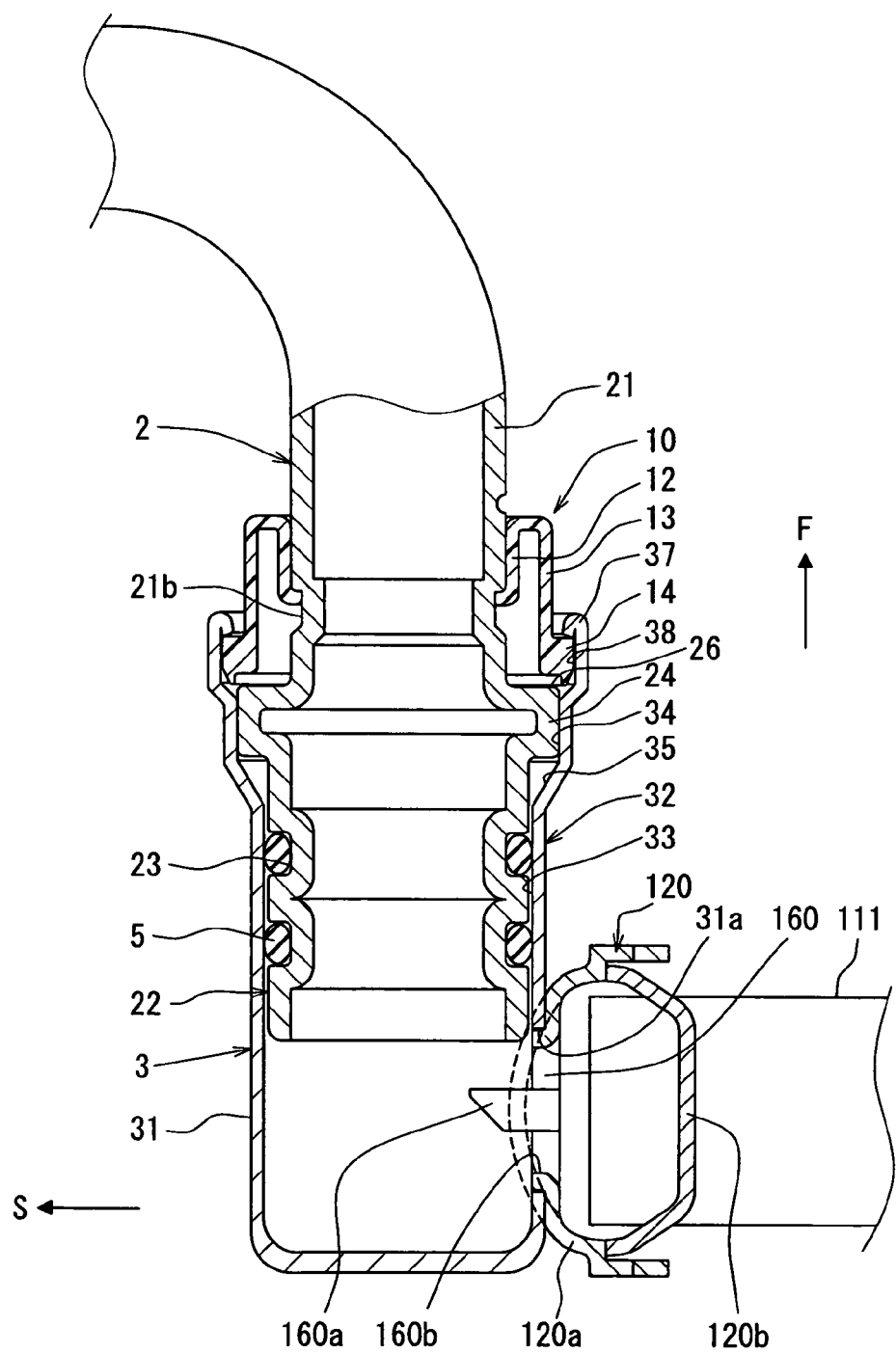
FIG. 2 is a schematic cross-sectional view of a coupling part of a connector of the condenser and an external pipe according to the first embodiment.

The tubular body is, for example, constructed by coupling an outer plate 120a and an inner plate 120b, as shown in FIG. 2. The outer plate 120a projects in an outward direction of the core 110. The inner plate 120b projects in an inward direction of the core 110. The outer plate 120a and the inner plate 120b are brazed with each other. For example, the outer plate 120a and the inner plate 120b are partly overlapped and brazed at the overlapped portions.

The cap members 140 are brazed to the longitudinal ends of the first header tank 120 such that openings 121 are covered. The second header tank 130 is formed by the similar manner. The cap members 140 are brazed to the longitudinal ends of the second header tank 130 such that opening 131 are covered.

Each of the cap member 140 has an extended portion that extends toward the side plate 113. Thus, the cap member 140 is brazed with the side plate 113 as well as the header tank 120, 130, to improve the strength of the condenser 100.

The first header tank 120 is provided with a first separator 122 for separating an inner space of the first header tank 120 into two spaces. The second header tank 130 is provided with a second separator 132a and a third separator 132b for separating an inner space of the second header tank 130 into three spaces.

Connectors 3 are coupled to the first and second header tanks 120, 130 by brazing. In the second header tank 130, the connector 3 is located at a position higher than the second separator 132a. In the first header tank 120, the connector 3 is located at a position lower than the first separator 122. In the present embodiment, the connector 3 of the second header tank 130 forms an inlet port for introducing the refrigerant into the condenser 100, and the connector 3 of the first header tank 130 forms an outlet port for discharging the refrigerant from the condenser 100. Coupling structures of the connectors 3 to the first and second header tanks 120, 130 will be described later in detail.

In the present embodiment, the refrigerant flows in the second header tank 130 from the right connector 3. The refrigerant passes through the tubes 111, the first and second header tanks 120, 130 while changing the flow direction by means of the separators 122, 132a, 132b. The refrigerant flows out from the condenser 100 from the left connector 3 of the first header tank 120. As such, the refrigerant flows in the condenser 100 in a generally serpentine manner as shown by arrows in FIG. 1.

The modulator tank 150 is connected to the second header tank 130 so that a liquid refrigerant flowing through the second header tank 130 is collected and stored therein. The modulator tank 150 is, for example, formed of a cylindrical container that is formed by extrusion. The modulator tank 150 is fixed to a side wall of the second header tank 130 by brazing.

The second header tank 130 is in communication with the modulator tank 150 through a first passage 151 and a second passage 152. The first and second passages 151, 152 are formed at opposite sides of the third separator 132b. In FIG.

1, the first passage 151 is formed at a position higher than the third separator 132b, and the second passage 152 is formed at a position lower than the third separator 132b.

The refrigerant flowing from the connector 3 of the second header tank 130 passes through the tubes 111 that are located higher than the second separator 132a toward an upper space of the first header tank 120. Further, the refrigerant flows into the tubes 111 that are located between the second separator 132a and the first separator 122 from the upper space of the first header tank 120. While the refrigerant flows through the tubes 111 located above the first and third separators 122, 132b in a U-turn manner, heat exchange is performed between the refrigerant and an external fluid, such as air. Thus, the refrigerant is condensed and liquefied.

The condensed liquid refrigerant is introduced in the modulator tank 150 through the first passage 151. In the modulator tank 150, the liquid refrigerant is separated into a liquid phase refrigerant and a gas phase refrigerant. The liquid phase refrigerant is introduced into a lower space of the second header tank 130 through the second passage 152, the lower space being located lower than the third separator 132b. The liquid refrigerant is super-cooled while passing through the tubes 111 that are located lower than the first and third separators 122, 132b, and is then discharged from the connector 3 of the first header tank 120. The modulator tank 150 is provided with a desiccating agent, a filter and the like for removing moisture and foreign materials from the refrigerant.

For example, the components of the condenser 100, such as the first and second header tanks 120, 130, the tubes 111, and the fins 112 are provided by clad members that are formed by cladding both surfaces of metallic plates with a brazing material. The components are preliminarily fixed in an appropriate manner, and then heated in a brazing furnace while being held in the preliminarily fixed condition. Thus, all the connecting portions of the components are brazed at a time.

In the preliminarily fixing, the longitudinal ends of the tubes 111 are inserted to the tube holes of the first and second header tanks 120, 130. Further, the connectors 3 are preliminarily fixed to the first and second header tanks 120, 130 such that communication holes 31a of the connectors 3 are fitted to fixing holes 160 of the first and second header tanks 120, 130 in a pressed manner.

As shown in FIG. 2, each of the connectors 3 is configured to receive a male joint part 22 of an external pipe 2 (e.g., a refrigerant pipe) and an engagement member 10 mounted on the pipe 2. That is, the connector 3 is engaged with the pipe 2 through the engagement member 10 that is mounted on an outer periphery of the pipe 2.

The pipe 2 has a generally tubular shape and allows the refrigerant to flow therein. The pipe 2 has a pipe main part 21 and the male joint part 22 at an end of the pipe main part 21. The male joint part 22 is more expanded in a diameter than the pipe main part 21 to be inserted to the connector 3.

The male joint part 22 is formed with annular sealing grooves 23. Sealing members 5 such as O-rings are fitted in the sealing grooves 23. In the present embodiment, the pipe 2 has two sealing grooves 23. However, the number of the sealing grooves 23 is not limited to two. For example, the pipe 2 may has more than one sealing groove 23.

The pipe 2 further has an expansion 24 at a base end of the male joint part 22, the base end connecting to the pipe main part 21. In other words, the expansion 24 is located on a side opposite to an open end of the male joint part 22 with respect to the sealing grooves 23 in an axial direction. The expansion 24 more expands in a radially outward direction than the male join part 22. The engagement member 10 is mounted on a rear side of the male joint part 22, that is on a side opposite to the sealing grooves 23 with respect to the expansion 24.

The expansion 24 has a substantially cylindrical wall, and an outer diameter of the expansion 24 is greater than those of the pipe main part 21 and the male joint part 22. Further, the expansion 24 forms a first step portion 26 on an axially rear end (e.g., upper end in FIG. 2) with an end of the pipe main part 21. The first step portion 26 serves as a first engaged portion 26 that is engaged with engagement portions 14 of the engagement member 10. The expansion 24 forms a second step portion on an axially front end (e.g., lower end in FIG. 2) with the base end of the male joint part 22. The second step portion of the expansion 24 is brought into contact with a base portion of an expanded pipe portion 34 of the connector 3.

The pipe main part 21 is formed with a restraining portion 21b. The restraining portion 21b, for example, has a groove shape. The pipe main part 21, for example, has an elbow shape. In other words, the pipe main part 21 includes a bend. The restraining portion 21b is provided for positioning the engagement member 10 with respect to the axial direction when the engagement member 10 is mounted on the pipe 2. That is, the restraining portion 21b serves as a stopper for restricting displacement of the engagement member 10 in a rear direction, when the pipe 2 is coupled to the connector 3.

In the present embodiment, the restraining portion 21b has the groove shape. However, the restraining portion 21b may have another structure. For example, the restraining portion 21b is formed into a projection projecting from an outer surface of the pipe main part 21. In this case, the engagement member 10 has a recess to engage with the projection of the pipe main part 21. As such, the displacement of the engagement member 10 in the axial direction is restricted by engagement of the projection 21b and the recess.

The connector 3 has a generally tubular shape having a closed end. The connector 3 has a female joint part 32 at an end of a tubular main part 31 to receive the pipe 2. The female joint part 32 has a generally tubular shape. The female joint part 32 has a diameter greater than that of the tubular main part 31. The female joint part 32 includes an insertion portion (first sleeve portion) 33 into which the male joint part 22 is fitted, an expanded pipe portion (second sleeve portion) 34 that is expanded more than the insertion portion 33, and an extended pipe portion (third sleeve portion) 37 extending from the expanded pipe portion 34.

The insertion portion 33 has an inner peripheral surface to be sealed with the male joint part 22 through the sealing members 5. The expanded pipe portion 34 is configured such that the expansion 24 of the male joint part 22 is fitted therein. The expanded pipe portion 34 has a tapered wall portion 35, which has a substantially conical shape. The expanded pipe portion 34 connects to the insertion portion 33 through the tapered wall portion 35. The second axial end of the expansion 24 is brought into contact with the tapered wall portion 35.

The extended pipe portion 37 is more expanded in the radially outward direction than the expanded pipe portion 34. The extended pipe portion 37 forms the end of the connector 3. An end of the extended pipe portion 37 is bent inwardly such that an inner diameter step portion 38 is formed in an inner periphery of the extended pipe portion 37. The inner diameter step portion 38 forms a recess or groove. The engagement portions 14 of the engagement member 10 are fitted in the inner diameter step portion 38. Further, the inner diameter step portion 38 is formed such that an end thereof is in contact with second contact portions 14a of the engagement portions 14.

The inner diameter step portion 38 is formed into the groove such that the engagement portions 14 are fitted in the inner diameter step portion 38 in a condition that the pipe 2 is connected to the connector 3, that is, when the expansion 24 is brought into contact with the tapered wall portion 35.

The insertion portion 33, the tapered wall portion 35, the expanded pipe portion 34 and the inner diameter step portion 38 are formed by plastically shaping an end of the pipe main part 31, such as by pipe expanding and the like. In the present embodiment, the inner diameter step portion 38 is formed into the groove extending entirely in a circumferential direction, on the inner periphery of the extended pipe portion 37. In other words, the inner diameter step portion 38 has an annular groove shape. However, the shape of the inner diameter step portion 38 is not limited to the annular groove shape. The inner diameter step portion 38 may be formed partly in the circumferential direction.

The pipe main part 31 has an inner diameter same as an inner diameter of the insertion portion 33. Alternatively, the pipe main portion 31 may has the inner diameter smaller than the inner diameter of the insertion portion 33. The side wall of the pipe main part 31 is arranged on an outer periphery of the header tank 120, 130.

The engagement member 10 is mounted on the outer periphery of the end of the pipe main part 21, the end connecting to the expansion 24. The engagement member 10 is made of a resinous material that allows an elastic displacement. Alternatively, the engagement member 10 may be made of a metallic material or integrally made of a resinous material and a metallic material.

The engagement member 10 is disposed to be coaxial with the pipe 2 and the connector 3. The engagement member 10 is arranged in a gap defined between the inner periphery of the extended pipe portion 37 of the connector 3 and the outer periphery of the pipe main part 21 of the pipe 2.

Figure 6A:
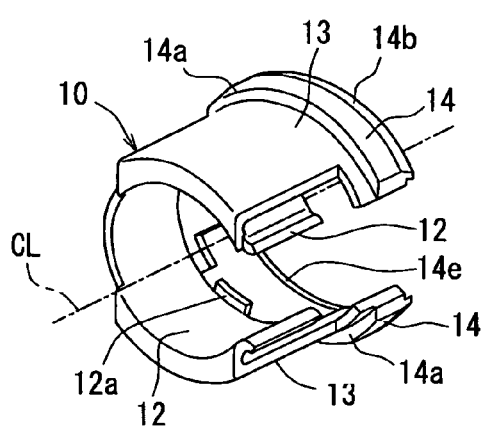
FIGS. 6A and 6B are perspective views of an engagement member for coupling the connector to the external pipe according to the first embodiment.
Figure 6B:
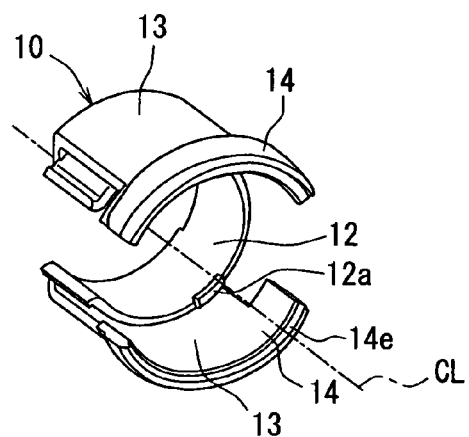

As shown in FIGS. 6A and 6B, the engagement member 10 has the engagement portions 14 that are engaged with the inner diameter step portion 38 and the expansion 24, elastically displacement portions 13 that allows elastic displacement of the engagement portion 14 in the radial direction, and pipe mounting portion 12 for mounting the engagement member 10 on the outer periphery of the pipe 2.

The engagement portions 14 are located to oppose with each other with respect to an axis CL. In the present embodiment, two engagement portions 14 are formed, for example. The number of the engagement portions 14 is set appropriately depending on a pressure applied to a coupling part of the connector 3 and the pipe 2. For example, the plural engagement portions 14 can be formed to be paired with respect to the axis CL. The plural pairs of engagement portions 14 can be formed separately in the circumferential direction. The engagement portions 14 can be arranged at constant or equal intervals in the circumferential direction, for example.

Each of the engagement portions 14 has a first contact portion 14e at an axial end. The first contact portion 14e is in the form of projection and is engaged with the first engaged portion 26 of the expansion 24. Further, the engagement portion 14 has a second contact portion 14a at an axial end, that is, opposite to the first contact portion 14e in the axial direction. The second contact portion 14a has a straight shape and is engaged with the end of the inner diameter step portion 38 of the connector 3.

The first contact portion 14e is engaged with the first engaged portion 26 of the pipe 2 and the second contact portion 14a is engaged with the inner diameter step portion 38 of the connector 3. In other words, both the axial ends of the engagement portion 14 are engaged with the pipe 2 and the connector 3.

After the pipe 2 is connected to the connector 3, when the pipe 2 and the condenser 100 are filled with the refrigerant and an internal pressure increases, the pipe 2 and the connector 3 respectively receive forces in directions to separate from each other (removal directions). As a result, the second contact portion 14a is brought into contact with the end of the inner diameter step portion 38 and engaged with the inner diameter step portion 38.

The engagement portion 14 is formed as a protrusion having an arc shape in the circumferential direction. Further, the engagement portion 14 has a substantially rectangular shape or a substantially trapezoidal shape in a cross section defined in the axial direction. The engagement portion 14 has a curved or arced outer peripheral wall and a tapered wall (inclined wall) 14b on the axial end.

The engagement portion 14 has a step portion at the axial end and on the inner periphery of the tapered wall 14b. The step portion provides the first contact portion 14e and is engaged with the first engaged portion 26 of the expansion 24. Also, the end surface of the engagement portion 14, which is opposite to the step portion in the axial direction, provides the second contact portion 14a and is engaged with the end of the inner diameter step portion 38 of the connector 3.

The pipe 2 and the connector 3 are coupled to each other by engaging the first contact portion 14e and the second contact portion 14a with the expansion 24 and the inner diameter step portion 38, respectively. Since the engagement portion 14 has the tapered wall 14b at the end, the engagement portion 14 can be moved in the inner diameter side by the end of the extended pipe portion 37 when the pipe 2 is inserted into the connector 3. As such, the engagement member 10 is smoothly inserted into the extended pipe portion 37.

The pipe mounting portion 12 has a substantially C-shape. In other words, the pipe mounting portion 12 has a substantially cylindrical shape with a slit extending in the axial direction. The pipe mounting portion 12 is mounted on the outer periphery of the pipe 2 in an elastically deformed condition. Since the pipe mounting portion 12 is provided by a thin wall having the substantially C-shape, the pipe mounting portion 12 can be mounted from a side of the pipe 2 by opening at the slit.

The pipe mounting portion 12 has nail portions 12a projecting in the radially inward direction of the pipe mounting portion 12. The nail portions 12a are engaged with the restraining portions 21b of the pipe main portion 21. The nail portions 12a are, for example, formed by bending portions of the pipe mounting portion 12 in the radially inward direction.

The elastically displacing portion 13 connects a rear end of the pipe mounting portion 12 and the engagement portion 14. The elastically displacing portion 13 support the engagement portion 14 such that the engagement portion 14 is elastically displaceable in the radial direction.

For example, the elastically displacing portion 13 includes a radially extending portion that extends from the rear end of the pipe mounting portion 12 in the radially outward direction, and an axially extending portion that extends from the radially extending portion in the axial direction. The axially extending portion further connects to the engagement portion 14. Thus, in the cross-section defined in the axial direction as shown in FIG. 2, the elastically displacing portion 13 and the pipe mounting portion 12 has a substantially U-shape.

The elastically displacing portion 13 has a wall thickness that is sufficiently smaller than a wall thickness of the engagement portions 14. Even if the elastically displacing portion 13 and the engagement portions 14 are made of the same resinous material, the elastically displacing portion 13 provides sufficient flexibility in the radial direction. Thus, the elastically displacing portion 13 allows the engagement portion 14 to elastically move in the radial direction. In the present embodiment, the engagement member 10 has a pair of elastically displacing portions 13 that are symmetrically located with respect to the axis CL, that is, opposed to each other with respect to the axis CL, for example.

Next, the coupling structure of the connector 3 to the condenser 100 will be described with reference to FIGS. 3 to 5. The two connectors 3 are coupled to the first and second header tanks 120, 130, respectively, in the similar manner. Therefore, the coupling structure of the connector 3 of the first header tank 120 will be hereinafter mainly described as an example.

Figure 3:
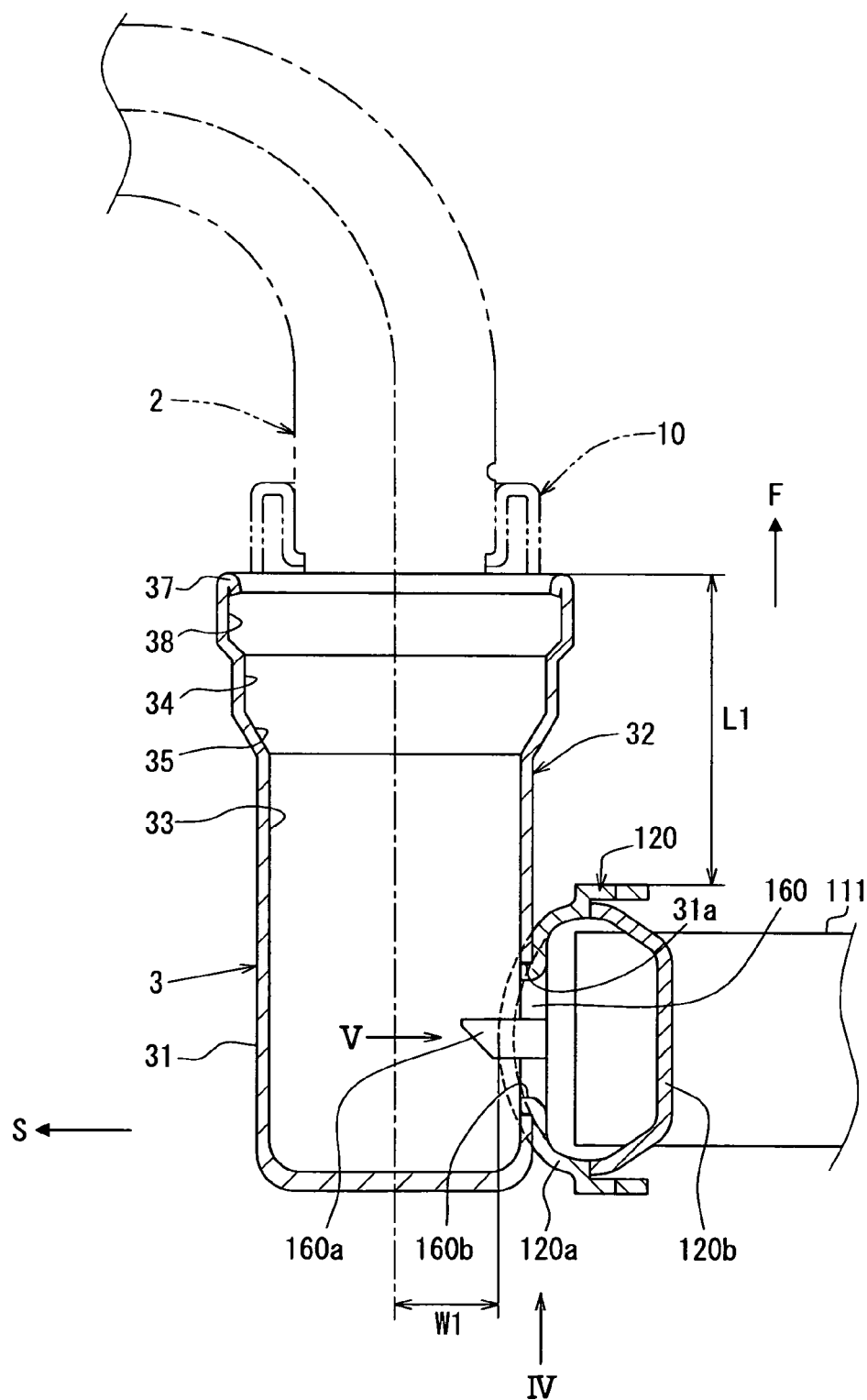
FIG. 3 is a cross-sectional view taken along a line III-III in FIG. 1.

In FIG. 3, an arrow F denotes a frontward direction of the condenser 100 and corresponds to a direction perpendicular to a paper surface of FIG. 1. An arrow S denotes a side direction of the condenser 100 and corresponds to a right and left direction in FIG. 1. The side direction S is parallel to the longitudinal direction of the tubes 111. The condenser 100 is mounted in an engine compartment of a vehicle such that the frontward direction F corresponds to a forward direction of the vehicle, and the side direction S corresponds to a right and left direction (e.g., a width direction) of the vehicle, for example.

In the present embodiment, the connector 3 is configured such that a projected length L1 in the frontward direction F and a projected width W1 in the side direction S are reduced as small as possible. As shown in FIG. 3, the end of the extended pipe portion 37 is located at a distance L1 from the front end of the first header tank 120 in the frontward direction F. In other words, the projected length L1 is a dimension of the connector 3 from the front end of the first header tank 120 to the end of the extended pipe portion 37 in the frontward direction F.

The connector 3 is arranged on the outer periphery of the first header tank 120 such that the closed end of the tubular main part 31 is aligned with a rear end of the first header tank 120. Thus, the communication hole 31a is formed on the side wall of the tubular main part 31, the side wall facing the first header tank 120 in the longitudinal direction of the tubes 111. The communication hole 31a is open in a direction substantially perpendicular to the axis CL of the female joint part 32.

The first header tank 120 is formed by joining the outer plate 120a and the inner plate 120b. The outer plate 120a is formed with a fixing hole 160 at a position corresponding to the communication hole 31a. As shown in FIG. 4, the outer plate 120a has a curved shape projecting in the outward direction of the core 110. The outer plate 120a is formed with a recess 161 having a shape corresponding to an outer shape of the tubular main part 31. The fixing hole 160 is formed in the recess 161.

Because the recess 161 is formed to recess in the inward direction of the core 110 and the fixing hole 160 is formed in the recess 161, a longitudinal axis (e.g., the axis CL) of the connector 3 becomes close to the core part 110. Thus, the connector 3 is disposed such that the axis CL is located at the distance W1 from the side end of the first header tank 120 in the side direction S. In other words, the projected width W1 corresponds to a distance of the axis CL of the connector 3 from the side wall of the first header tank 120 in the side direction S.

In the present embodiment, the connector 3 is coupled to the first header tank 120 such that the side wall of the tubular main part 31 is connected to the side wall of the first header tank 120. Also, the first header tank 120 is partly recessed in the inward direction of the core 110 at the recess 161, and the connector 3 is disposed such that the tubular main part 31 is partly received in the recess 161. Therefore, the projected length L1 and the projected width W1 of the connector 3 in the frontward direction F and the side direction S are reduced. For example, the projected width W1 is smaller than a radius of the tubular main part 31 by the dimension of the recess 161 with respect to the longitudinal direction of the tubes 111.

Figure 7A:
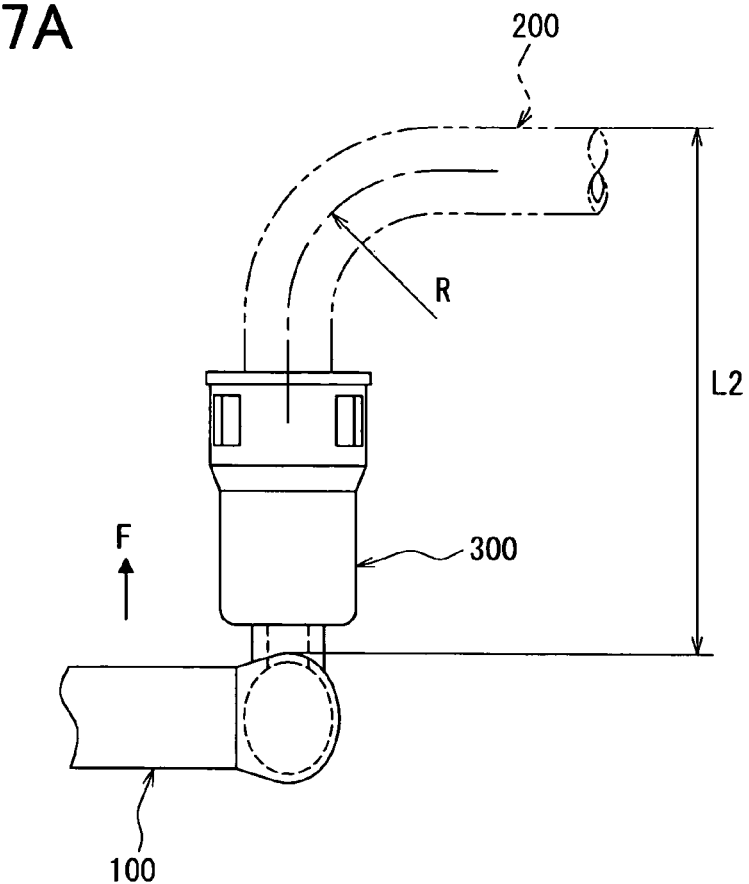
FIG. 7A is a coupling part of a connector and an external pipe as a comparative example.
Figure 7B:
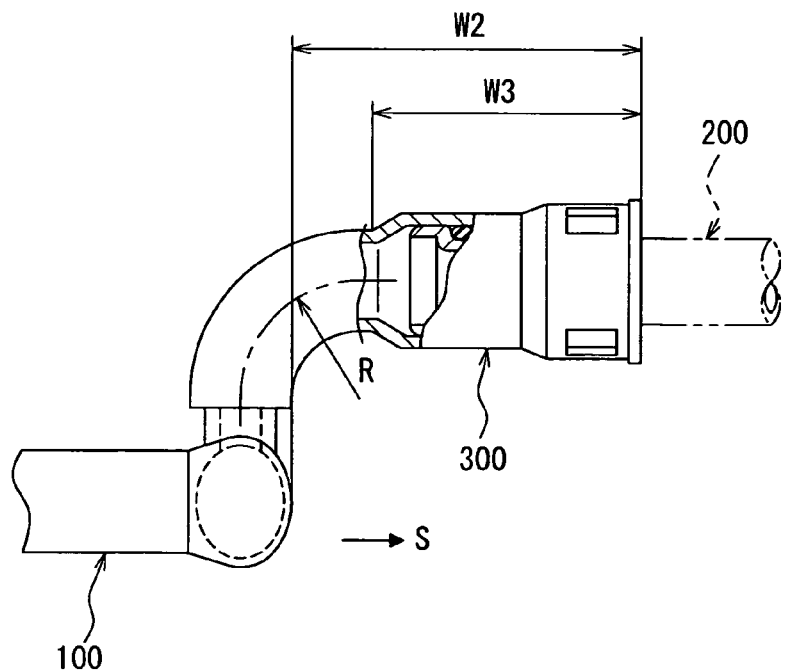
FIG. 7B is a coupling part of a connector and an external pipe as another comparative example.

FIGS. 7A and 7B show coupling structures as comparative examples. In the coupling structure shown in FIG. 7A, a connector 300 is coupled to a front end of the header tank and extends in the frontward direction F, and an open end of a female joint part of the connector 300 faces in the frontward direction F. The end of the pipe 200 is curved in the form of elbow to reduce a dimension L2 in the frontward direction F. However, a fixing part between the connector 300 and the header tank, the female joint part of the connector 300 and a male joint part of an external pipe 200 are linearly arranged. Therefore, the projected length of the coupling part in the frontward direction F increases.

A working space for connecting or disconnecting the male joint part of the pipe 200 to or from the connector 300 is required in front of the condenser 100. To further reduce the dimension L2 of the coupling structure in the frontward direction F, it is proposed to form the connector 300 in the shape of elbow as shown in FIG. 7B. In this case, the connector 300 is coupled to a front end of the header tank. The open end of the female joint part of the connector 300 faces in the side direction S. However, a projected dimension W2 of the connector 3 from a side end of the header tank in the side direction S increases. In other words, when the connector 300 has the elbow shape, the projected dimension W2 is determined by the sum of a radius R of the bent of the elbow shape and an effective length W3 of the female joint part 32.

Figure 4:
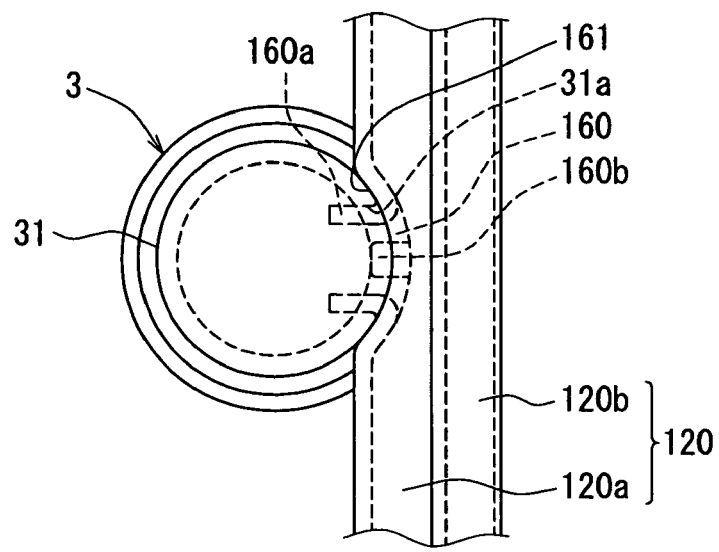
FIG. 4 is a side view of the coupling part, when viewed along an arrow IV in FIG. 3.

In the present embodiment shown in FIGS. 2 to 4, on the other hand, the connector 3 is coupled to the side wall of the header tank 120. That is, the fixing part of the connector 3 is formed on the side wall of the header tank 120, the side wall facing in the side direction S. Therefore, the projected length L1 of the connector 3 in the frontward direction F is reduced. Further, the connector 3 is coupled to the side wall of the header tank 120 such that the side wall of the tubular main part 31 is partly received in the recess 161 of the header tank 120. Therefore, the projected width W1 of the connector 3 is reduced. For example, the projected width W1 is reduced by the dimension of the recess 161 in the side direction S.

Figure 5:
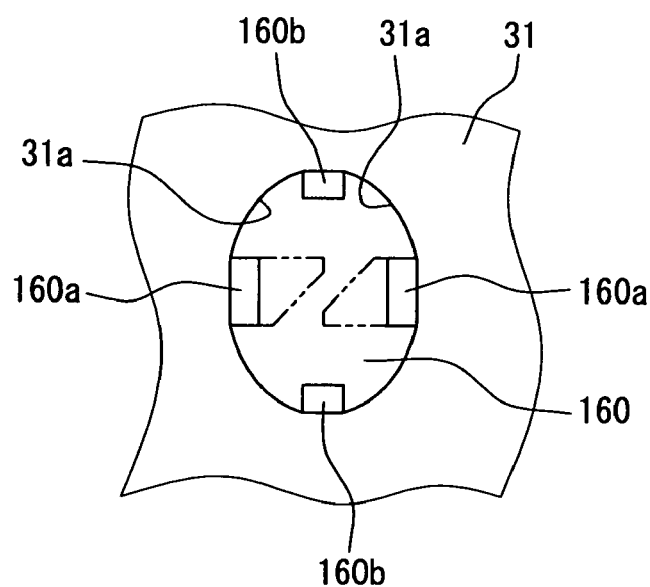
FIG. 5 is a partial view of the coupling part, when viewed along an arrow V in FIG. 3.

In the present embodiment, as shown in FIGS. 4 and 5, the communication hole 31a has a substantially elliptical shape. Also, the fixing hole 160 has a substantially elliptical shape to correspond to the communication hole 31a. The outer plate 120a is formed with first projections 160a and second projections 160b on a perimeter of the fixing hole 160. The first and second projections 160a, 160b project outward, that is, toward the connector 3. In the present embodiment, the outer plate 120a has four projections 160a, 160b in total. The first projections 160a have the predetermined length so that the first projections 160a project more inside of the tubular main part 31 than an inner peripheral surface of the tubular main part 31. The second projections 160b has the predetermined length so that the second projections 160b reach the inner peripheral surface of the tubular main part 31.

In FIG. 5, double-dashed chain lines denote developed views of the first projections 160a. The ends of the first projections 160a are inclined relative to each other, and are bent outside of the outer plate 120a. As such, the predetermined length of the first projections 160a is provided.

For example, the first projections 160a are located on a minor axis of the elliptical shape of the fixing hole 160 and are opposed to each other. Also, the second projections 160b are located on a major axis of the elliptical shape of the fixing hole 160 and are opposed to each other.

The communication hole 31a of the tubular main part 31 has a predetermined opening shape such that the first and second projections 160a, 160b are received in the communication hole 31a. To assemble the connector 3 and the first header tank 120, the connector 3 is preliminarily fixed to the outer peripheral surface of the outer plate 120a first, and then the inner plate 120b is connected to the outer plate 120a.

For example, the connector 3 is configured such that the base end of the insertion portion 33, which connects to the tubular main part 31, is located close to the end of the second projection 160b. Therefore, it is less likely that the end of the male joint part 22 inserted in the female joint part 32 will interfere with the end of the second projection 160b. Further, the axial length of the connector 3 is reduced.

Next, a method of preliminarily fixing the connector 3 to the outer peripheral surface of the outer plate 120a will be described. First, the first and second projections 160a, 160b are inserted in the communication hole 31a of the tubular main part 31. Then, the first and second projections 160a, 160b are bent or expanded outward from the inner side of the outer plate 120a. Thus, the first and second projections 160a, 160b are crimped to the perimeter of the communication hole 31a. In other words, the first and second projections 160a, 160b are fitted to the communication hole 31a in a deformed manner. Accordingly, the connector 3 is preliminarily fixed to the outer plate 120a.

At this time, the connector 3 is positioned to the first header tank 120 and preliminarily fixed to the first header tank 120 by the first and second projections 160a, 160b. That is, the first and second projections 160b serve as positioning means and preliminarily fixing means. The position of the connector 3 with respect to the frontward direction F is determined by the first projections 160a. The position of the connector 3 with respect to the up and down direction of the condenser 100 is determined by the second projections 160b.

Further, since the first and second projections 160a, 160b are formed at plural positions, the fixing angle of the connector 3 is determined by the first and second projections 160a, 160b. After the connector 3 is preliminarily fixed to the outer plate 120a, the outer plate 120a is preliminarily fixed to the inner plate 120b. In the present embodiment, the outer plate 120b has the four projections 160a, 160b in total. However, the number of the projections 160a, 160b is not limited to four. The outer plate 120b preferably has more than two projections at least.

The base end of the insertion portion 33 is formed at a predetermined position so that the end of the male joint part 22 is not interfered with the first projections 160a that projects inside of the tubular main part 31 in the condition that the pipe 2 is connected to the connector 3. That is, as shown in FIGS. 2 and 3, the insertion portion 33 is configured such that the end of the male joint part 22 is located adjacent to the first projections 160a. With this, the length of the connector 3 is reduced. As such, the projected length L of the connector 3 is reduced.

Next, a method of assembling the pipe 2 and the engagement member 10 will be described with reference to FIG. 2. The assembling of the pipe 2 and the engagement member 10 is, for example, performed after the condenser 100 is mounted on the engine compartment of the vehicle.

First, the engagement member 10 is mounted on the outer periphery of the pipe 2 by expanding the substantially C-shaped pipe mounting portion 12 at the slit. The male joint part 22 is placed at a position opposed to the extended pipe portion 37 of the connector 3, and then inserted into the extended pipe portion 37. Thus, the end of the male joint part 22 is inserted to the insertion portion 33 of the connector 3.

The sealing members 5 of the male joint part 22 are started to be inserted to the insertion portion 33 at the same time as the end of the engagement portions 14 are brought into contact with the end of the extended pipe portion 37. When the end of the male joint part 22 is further inserted to the insertion portion 33 from this condition, the tapered walls 14b of the engagement portions 14 are pressed by the end of the extended pipe portion 37. Thus, the engagement portions 14 are moved in the radially inward direction.

Further, the axially front end of the expansion 24, that is, the second step portion of the expansion 24 is brought into contact with the tapered wall 35 of the expanded pipe portion 34, and the engagement portions 14 are received in the inner diameter step portion 38 by elastically returning to original positions. Accordingly, the pipe 2 and the connector 3 are coupled through the engagement member 10 by a one-touch operation.

In the coupling structure in which the female joint part 32 and the male joint part 22 are linearly coupled, a working space for coupling or separating the male joint part 22 to or from the connector 3 is necessary in front of the condenser 100. In the present embodiment, since the projected length L1 in the frontward direction F of the condenser 100 and the projected width W1 in the side direction S of the condenser 100 are reduced, the mounting space is reduced.

The header tank 120 is formed with the recess 161 having the shape corresponding to the outer shape of the tubular main part 31 of the connector 3, and the connector 3 is arranged on the outer periphery of the header tank 120 such that the tubular main part 31 is partly received in the recess 161. Therefore, the projected width W1 of the connector 3 in the side direction S can be reduced. Further, the projected width W1 of the connector 3 is reduced, as compared with the connector having the elbow shape exemplarily shown in FIG. 7B.

Further, the connector 3 is arranged such that the rear end of the tubular main part 31 is aligned with the rear end of the header tank 120 with respect to the direction parallel to the frontward direction F. As such, the projected length L1 of the connector 3 is reduced.

Since the header tank 120 has the first and second projections 160a, 160b on the perimeter of the fixing hole 160, the connector 3 is easily and appropriately positioned relative to the fixing hole 160. Also, the preliminary fixing of the connector 3 to the header tank 120 is eased.

Since the first and second projections 160a, 160b are located at positions without interfering with the end of the male joint part 22 received in the female joint part 32, the projected length L1 of the connector 3 is reduced.

Second Embodiment

In the first embodiment, the communication hole 31a has the substantially elliptical shape. However, the communication hole 31a can have any other shapes such as a substantially circular shape, a substantially polygonal shape, a substantially round shape with expansions.

FIGS. 8A, 8B, 9, 10 show exemplary shapes of the communication holes 31a. In the example shown in FIG. 8A, the communication hole 31a has a substantially circular shape such that the projections 160a of the fixing hole 160 are surrounded. Also in this example, the connector 3 is easily positioned relative to the fixing hole 160.

Figure 8A:
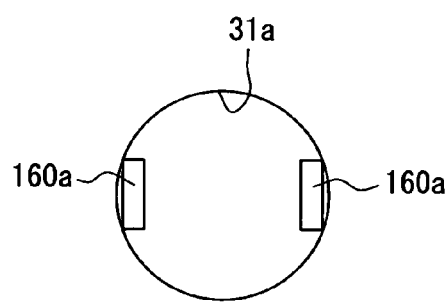
FIG. 8A is a partial view for showing an example of a communication hole of a connector according to a second embodiment of the present invention.
Figure 8B:
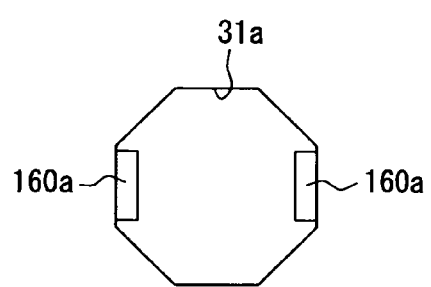
FIG. 8B is a partial view for showing another example of the communication hole of the connector according to the second embodiment.

In the example shown in FIG. 8B, the communication hole 31a has a substantially polygonal shape, such as octagon, so that the projections 160a of the fixing hole 160 are surrounded. In this case, the positioning angle of the connector 3 relative to the fixing hole 160 can be varied at a predetermined pitch or angular interval, such as every 45°.

Figure 9:
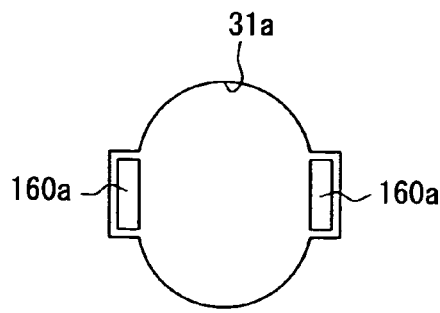
FIG. 9 is a partial view for showing further another example of the communication hole of the connector according to the second embodiment.

In the example shown in FIG. 9, the communication hole 31a has a shape that surrounds an outer periphery of the projections 160a. For example, the communication hole 31a has a substantially round shape, such as a substantially elliptical shape, and portions corresponding to the projections 160a are expanded to surround the projections 160a. In this case, the positioning angle of the connector 3 relative to the fixing hole 160 can be easily determined. Further, in the preliminarily fixed condition, torque strength of the joining portions improves.

Figure 10:
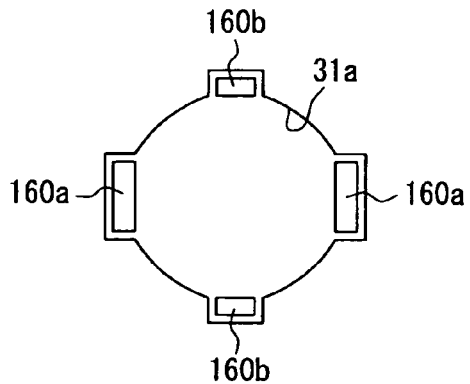
FIG. 10 is a partial view for showing still another example of the communication hole of the connector according to the second embodiment.

In the example shown in FIG. 10, the header tank 120 has the four projections 160a, 160b in total. The communication hole 31a has a substantially round shape having expansions (recesses) at positions corresponding to the projections 160a, 160b so that the outer peripheries of the four projections 160a, 160b are surrounded. Here, the first projections 160a has the projection length greater than that of the second projections 160b. Thus, the angle of the connector 3 relative to the fixing hole 160 is easily determined. Further, in the preliminarily fixed condition, the torque strength of the joining portions improves.

Third Embodiment

Figure 11A:
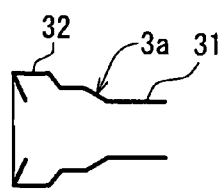
FIGS. 11A to 11C are schematic views for showing an example of a manufacturing process of a connector according a third embodiment of the present invention.
Figure 11B:
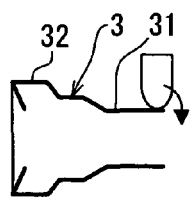
Figure 11C:
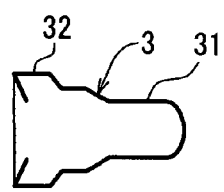

The connector 3 can be formed in various manners shown in FIGS. 11A through 13B. For example, in the example shown in FIGS. 11A, 11B and 11C, the connector 3 having the closed end on one side is formed by pressing (press-working). First, as shown in FIG. 11A, a pipe member 3a having open ends on both sides is prepared, and the tubular main part 31 and the female joint part 32 are formed from the pipe member 3a by plastically forming such as pipe expanding and pressing. Then, as shown in FIG. 11B, the end of the tubular main part 31 is closed by closing. Thus, the connector 3 having the closed end on one side is formed, as shown in FIG. 11C. Further, the communication hole 31a is formed on the predetermined portion of the tubular main part 31 by pressing or punching. In this way, the connector 3 is produced with low costs and high productivity.

Figure 12A:
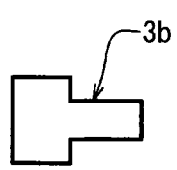
FIGS. 12A and 12B are schematic views for showing another example of the manufacturing process of the connector according to the third embodiment.
Figure 12B:
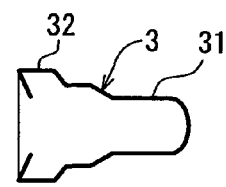

In the example shown in FIGS. 12A and 12B, the connector 3 having the closed end on one side is formed by cold forging. As shown in FIG. 12A, a solid material 3b for cold forging is prepared. Then, the female joint part 32 and the tubular main part 31 are formed from the solid material 3b by cold forging. Thus, as shown in FIG. 12B, the connector 3 having the closed end is produced. Also in this case, the connector 3 is produced with low costs and high productivity.

Figure 13A:
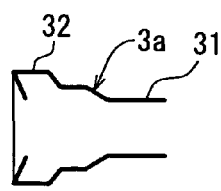
FIGS. 13A and 13B are schematic views for showing further another example of the manufacturing process of the connector according to the third embodiment.
Figure 13B:
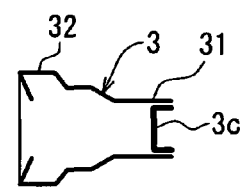

In the example shown in FIGS. 13A to 13C, the closed end of the connector 3 is formed by a separate member. As shown in FIG. 13A, the tubular main part 31 and the female joint part 32 are formed from the pipe member 3a by pressing, in the similar manner shown in FIG. 11A. Then, as shown in FIG. 13B, a cover member 3c is attached to the open end of the tubular main part 31. Namely, the open end of the tubular main part 31 is closed by another member. Also in this case, the connector 3 having the closed end is produced with low costs and high productivity.

Other Embodiments

The above embodiments are exemplarily employed to the condenser 100 with the connector 3. However, the heat exchanger to which the connector 3 having the closed end is not limited to the condenser 100, but may be any other device such as an evaporator and a heat exchanger used for any purposes, other than the refrigerant cycle for the vehicular air conditioner. Also, the internal fluid is not limited to the refrigerant. The heat exchanger with the connector 3 can be any heat exchangers filled with a fluid. The heat exchanger can be implemented in various combinations of the above embodiments.

Additional advantages and modifications will readily occur to those skilled in the art. The invention in its broader term is therefore not limited to the specific details, representative apparatus, and illustrative examples shown and described.

What is claimed is:

1. A heat exchanger comprising:
a plurality of tubes;
a pair of header tanks coupled to opposite ends of the plurality of tubes communicating with the plurality of tubes; and
a connector coupled to one of the pair of header tanks, wherein
the connector has a substantially tubular shape and includes a female joint part to be coupled to a male joint part of an external pipe and a tubular part that extends from the female joint part and has a closed end on a side opposite to the female joint part, and
the connector is disposed such that a side wall of the tubular part is located on an outer peripheral wall of the header tank,
the header tank is formed with a fixing hole and a plurality of projections on a perimeter of the fixing hole,
the female joint part includes an insertion portion into which the male joint part is to be fitted,
the insertion portion is configured to receive the male joint part such that an end of the male joint part is inserted to a position where at least one of the projections is formed, and
the projections are configured such that they don't interfere with the end of the male joint part.

2. The heat exchanger according to claim 1, wherein the connector is disposed so that a projected width of the connector with respect to a direction substantially perpendicular to a longitudinal axis of the header tank is reduced.

3. The heat exchanger according to claim 1, wherein
the connector is disposed such that the closed end of the tubular part is aligned with a rear end of the header tank so that a projected length of the connector from a front end of the header tank to an end of the female joint part is reduced.

4. The heat exchanger according to claim 1, wherein
the side wall of the tubular part forms a communication hole that opens in a direction substantially perpendicular to an axis of the female joint part,
the outer peripheral wall of the header tank is formed with a recess having a shape corresponding to an outer shape of the side wall of the tubular part,
the fixing hole is formed in the recess and the projections project toward the connector from the perimeter of the fixing hole, and
the connector is preliminarily fixed to the header tank by fitting the projections in the communication hole and crimping the projections to a perimeter of the communication hole.

5. The heat exchanger according to claim 4, wherein
at least one of the projections has a projections length that reaches an inner surface of the tubular part.

6. The heat exchanger according to claim 4, wherein
the communication hole has one of a substantially circular shape, a substantially oval shape, a substantially polygonal shape, and a substantially round shape with expansions.

7. The heat exchanger according to claim 1, wherein
the female joint part of the connector includes an extended pipe potion extending in a direction opposite to the tubular part, the extended pipe portion defines an engaged portion on an inner periphery thereof, the heat exchanger further comprising an engagement member disposed in a space defined between an outer periphery of the external pipe and the extended pipe portion, wherein the engagement member includes an engagement portion that is engaged in the engaged portion of the extended pipe portion for maintaining a coupling condition of the external pipe and the connector.

8. The heat exchanger according to claim 1, wherein
the connector is disposed on the outer peripheral wall of the header tank on a side opposite to the tubes with respect to a longitudinal direction of the tubes, the outer peripheral wall of the header tank is formed with a recess having a shape corresponding to an outer shape of the side wall of the tubular part, and the connector is disposed such that an axis of the tubular part is substantially perpendicular to a longitudinal axis of the header tank and the side wall of the tubular part is partly received in the recess.

9. The heat exchanger according to claim 4, wherein
the connector is disposed on the outer peripheral wall of the header tank on a side opposite to the tubes with respect to a longitudinal direction of the tubes, and the connector is disposed such that an axis of the tubular part is substantially perpendicular to a longitudinal axis of the header tank and the side wall of the tubular part is partly received in the recess.

10. A heat exchanger comprising:
a plurality of tubes;
a pair of header tanks each extending in a longitudinal direction of the pair of header tanks, the pair of header tanks being coupled to opposite ends of the plurality of tubes to communicate with the plurality of tubes, the plurality of tubes extending between the pair of header tanks in a longitudinal direction of the plurality of tubes, the longitudinal direction of the plurality of tubes being perpendicular to the longitudinal direction of the pair of header tanks; and a connector coupled to one of the pair of header tanks, wherein the connector has a substantially tubular shape which defines a central axis of the tubular shape and includes a female joint part to be coupled to a male joint part of an external pipe and a tubular part that extends from the female joint part and has a closed end on a side opposite to the female joint part, the central axis of the tubular shape of the connector being perpendicular to the longitudinal direction of the plurality of tubes and perpendicular to the longitudinal direction of the pair of header tanks, and the connector is disposed on an outer peripheral wall of the header tank, the female joint part includes an insertion portion in which the male joint part is fitted, the tubular part extends from a base portion of the insertion portion, an outer diameter of an end of the male joint part is equal to an inner diameter of the base portion of the insertion portion, and an end of the male joint part is received in the base portion of the insertion portion, the tubular part is formed with a communication hole that opens in a direction substantially perpendicular to an axis of the female joint part, and the base portion of the insertion portion extends to the communication hole.

11. The heat exchanger according to claim 10, wherein
the outer peripheral wall of the header tank is formed with a recess having a shape corresponding to an outer shape of the tubular part, a fixing hole in the recess, and a plurality of projections on a perimeter of the fixing hole, the connector is coupled to the header tank such that the tubular part is partly received in the recess, and the projections are crimped to a perimeter of the communication hole, and the projections are located at positions without interfering with the end of the male joint part.

12. The heat exchanger according to claim 10, wherein
the connector is disposed on the outer peripheral wall of the header tank on a side opposite to the tubes with respect to the longitudinal direction of the tubes.

13. The heat exchanger according to claim 10, wherein
an entire wall of the connector has a substantially equal thickness.

\* \* \* \* \*